(12) United States Patent
Petersen

(10) Patent No.: US 8,403,304 B2
(45) Date of Patent: Mar. 26, 2013

(54) OPEN AIR VEHICLE COOLING DEVICE AND METHOD

(75) Inventor: Ari Petersen, Encinitas, CA (US)

(73) Assignee: Golf Cart Misters, Inc., Encinitas, CA (US)

( * ) Notice: Subject to any disclaimer, the term of this patent is extended or adjusted under 35 U.S.C. 154(b) by 599 days.

(21) Appl. No.: 12/507,662

(22) Filed: Jul. 22, 2009

(65) Prior Publication Data

US 2011/0022226 A1 Jan. 27, 2011

(51) Int. Cl.
*B01F 3/04* (2006.01)

(52) U.S. Cl. ............... 261/28; 261/78.2; 261/DIG. 43; 62/244; 239/172

(58) Field of Classification Search .............. 261/28, 261/78.2, DIG. 43; 62/244; 239/172
See application file for complete search history.

(56) References Cited

U.S. PATENT DOCUMENTS

| | | | |
|---|---|---|---|
| 3,583,174 A | 6/1971 | Logue | |
| 3,738,621 A | 6/1973 | Anderson | |
| 4,360,368 A | 11/1982 | Lyon | |
| 5,044,520 A | 9/1991 | Moisan | |
| 5,112,535 A | 5/1992 | Roberson | |
| 5,285,654 A | 2/1994 | Ferdows | |
| 5,613,371 A | 3/1997 | Nelson | |
| 6,325,362 B1 | 12/2001 | Massey et al. | |
| 6,471,194 B2 * | 10/2002 | Keeney | 261/30 |

OTHER PUBLICATIONS

PCT/US2010/042866 International Search Report dated Sep. 14, 2010.
PCT/US2010/042866 Written Opinion dated Sep. 14, 2010.

* cited by examiner

*Primary Examiner* — Robert A Hopkins
(74) *Attorney, Agent, or Firm* — DLA Piper LLP (US)

(57) ABSTRACT

A vehicle misting device and method that is operable is dry and humid environments are provided. The device may also include a payment system and fan.

20 Claims, 2 Drawing Sheets

OPEN AIR VEHICLE COOLING DEVICE AND METHOD

FIELD

The disclosure relates generally to a vehicle cooling method and device and in particular to an open air vehicle misting method and device.

BACKGROUND

People want to be outdoors in various climates, including dry, hot climates and hot humid climates. People are sometimes outdoors in open-air vehicles such as golf carts, "Jeeps" and other convertible sport utility vehicles, dune buggies, motorcycles, boats, tractors and other agricultural or construction vehicles that have an open-air occupant compartment. In some climates, it may be uncomfortable to ride in these vehicles during the hottest parts of the year or times when it is very humid because the heat in the ambient air or the humidity becomes intolerable. Thus, it is desirable to provide a way of cooling the occupants of these open-air vehicles.

Evaporative cooling systems for vehicles are known in which air cooled by evaporation is blown into the occupant compartment of the vehicle. These systems are based on a general concept of a pump spraying water onto a pad or filter, saturating it. A fan draws hot air through the pad and blows the resulting cooled air into the vehicle. Typically, these relatively large apparatus are mounted to the roof of vehicles.

Another method of evaporative cooling involves spraying a fine mist of water into the ambient air in which the mist absorbs the heat and cools the air via evaporative cooling, and the mist settles onto the skin of the occupant and cools the occupant through direct evaporation. Mister nozzles are well known in the southwestern United States and are commonly used for cooling large areas of property, such as patios and spectator stands at ballparks. Due to the need for a large water source and pumping system, these known misting apparatus are stationary.

A known misting system for golf carts exists which works well in dry environments, but does not work well in humid environments. This known misting system also does not have any fans, which cool persons more effectively in humid environments. This system also does not have any on-board payment system so that the occupant of the vehicle can choose to pay for the misting. Thus, it is desirable to provide an open air vehicle cooling system and method that can be used in dry or humid environments and can incorporate a fan and payment system and it is to this end that the disclosure is directed.

DETAILED DESCRIPTION OF ONE OR MORE EMBODIMENTS

The disclosure is particularly applicable to a golf cart cooling system and method with a payment system and it is in this context that the disclosure will be described below. It will be appreciated, however, that the system and method has greater utility since it can be used with any open-air vehicle or any vehicle in which it is desirable to provide cooling of the occupants of the vehicle.

Figure 1:
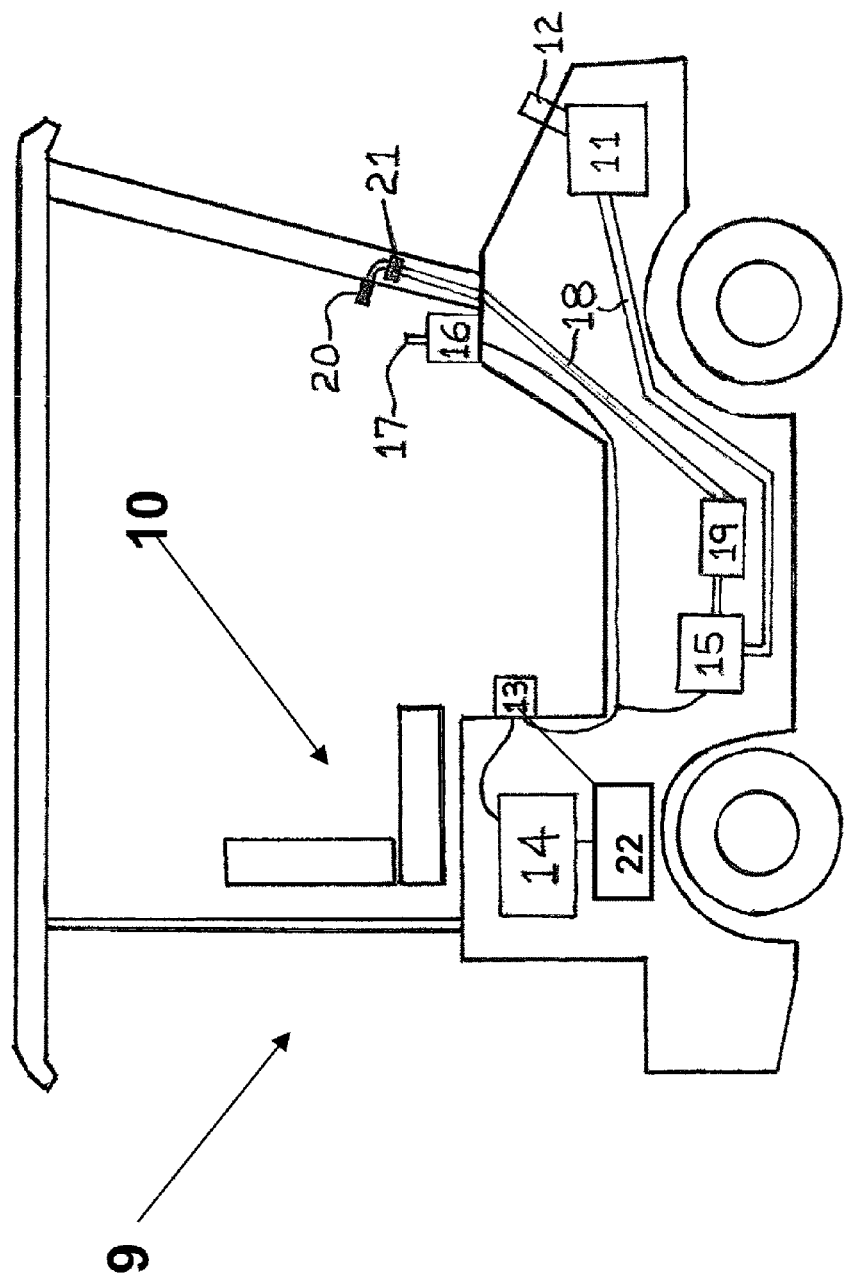
FIG. 1 illustrates an open air vehicle with a cooling system that incorporates a payment system.

FIG. 1 illustrates an open air vehicle 9 with a cooling system that incorporates a payment system. The open-air vehicle may be a golf cart, a "Jeep" and other convertible sport utility vehicles, dune buggies, motorcycles, boats, tractors and other agricultural or construction vehicles that have an open-air occupant compartment. In the example below, a golf cart is used for illustration purposes as an example of an open air vehicle. The vehicle may have a seating area 10 for one or more occupants, such as a seat for a golf cart as shown in FIG. 1. The vehicle also incorporates a cooling system complete with fan(s) for cooling the occupant(s) of the open air vehicle in both dry and humid environments. The vehicle may also incorporate a payment system that the one or more occupants of the vehicle may use to pay to activate the misting system or other products/services as described below in more detail.

As shown in FIG. 1, the cooling system may further comprise a liquid reservoir 11 that may be filled with a liquid, such as water, through a tamper-proof fill valve 12 so that the occupant(s) of the vehicle cannot drain or fill the reservoir 11. The reservoir 11 may be located so that it is not visible to the occupant of the vehicle, but the fill valve 12 may be readily accessible so that an authorized user can open the fill valve 12 and re-fill the reservoir as needed. The cooling system may further comprise a piece of tubing 18 that connects to the reservoir to a pump 15 and an accumulator 19 that is connected to the pump. The pump may also optionally include a filter.

The accumulator 19 is pressurized partially with air, partially with water. Once the accumulator 19 is pressurized and the cooling system is operational, the pump 15 shuts off since the accumulator 19 can supply pressurized liquid when the demand of the cooling system is greater than the pump can momentarily supply. The pressurized accumulator 19 results in a steady flow of mist during the operation of the cooling system, instead of a mist flow that pulses with the cycles of the pump.

The pump 15 is connected to a power source 14, such as battery, through a card reader/display unit 13 that is described below in more detail so that the pump 15 is supplied power when the cooling system is activated. The cooling system may further comprise a piece of tubing 18 that connects the accumulator 19 to one or more mister heads/nozzles 20 wherein the mister heads/nozzles have an intensity controller switch 21 that allows the mist from the mister heads/nozzles to be controlled from completely off to partially on or fully on by the occupants of the vehicle. The mister heads/nozzles are known in the art and can be purchased commercially in varying flow rates. The optimum flow rate for each use depends on the temperature of the ambient air and the length of time misting is desired. Each mister head/nozzle can have its angle or position changed in order to change the mist that is directed towards the occupant(s) of the vehicle.

The cooling system may further comprise of one or more fans 16 that have a switch 17 to control the speed of the fans and turn the fans on/off by the user of the vehicle. The fan(s) 16 may also be adjustable/directional. When operational, the fan(s) blow the mist towards the occupant(s) of the vehicle which makes the cooling more effective, especially in humid environments.

The payment system of the vehicle may include a card reader/display unit 13 and a control/communications unit 22 that is connected to the power source 14 and the card reader/display unit 13 wherein the control/communications unit 22 can communicate using wireless (for example cellular or Bluetooth) or wired technology (for example, cable or wire). The card reader/display unit 13 may allow a user to authorize a payment for a service/product (such as a device that is capable of reading a credit card or other payment device) and may also have a display, such as indicator lights or an LCD display to indicate the status of the payment to the user (payment accepted or payment not accepted) and instructions for using the payment system and/or messages from a system operator to the vehicle occupant. The card reader/display unit 13 may be powered by its own battery (not shown), solar powered or may be connected to the vehicle Power Supply 14. The control/communications unit 22 or the card reader/display unit 13 may also have a trigger device that can electrically activate the cooling system once the payment is authorized and a timer unit that activates the cooling system for a predetermined time. The trigger device may be a hardware circuit or device controlled by a controller such as a microcontroller or USB/Serial controlled relay/switching unit and the timer unit may be a hardware device or software executed by the microcontroller that turns on the trigger device for a predetermined amount of time. Thus, the payment system allows a user of the vehicle to pay for a service/product offered, such as the operation of the cooling system.

Figure 2:
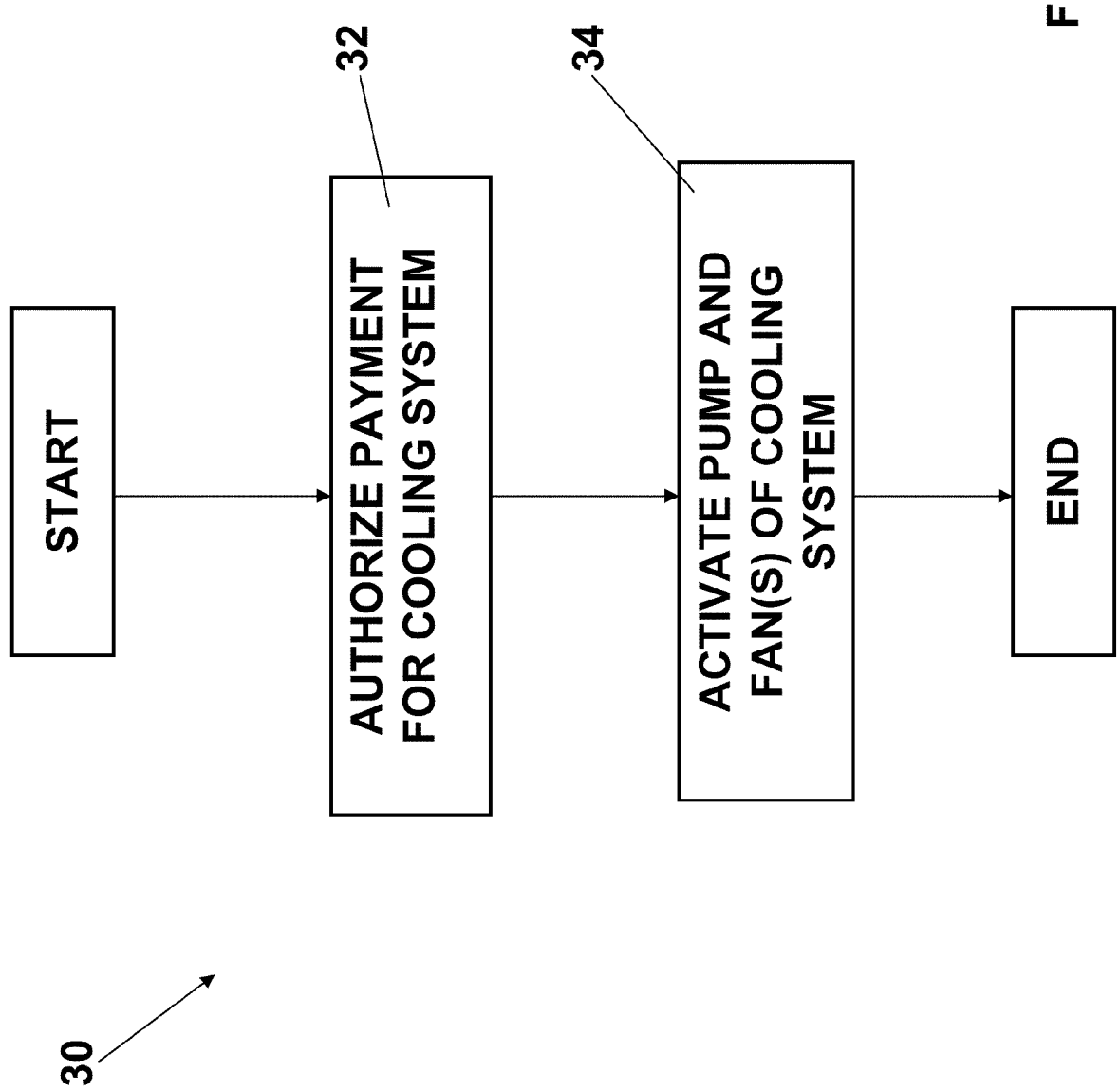
FIG. 2 illustrates a method that incorporates fan(s) and payment system for operation of the cooling system.

FIG. 2 illustrates a method 30 for operation of the cooling system. In operation, a credit card or handheld payment device (i.e. cell phone) is passed through/over the card reader/display unit 13 to authorize a payment 32, such as payment for operation of the cooling system during an outdoor activity in this example. The control/communications unit 22 and card reader/display unit 13 could also be used to activate other potential "pay for play" devises such as golf cart GPS systems. In one embodiment, each occupant could also be given a username/password whereby they could log onto a cooling system via the display to pay for and activate the cooling system. Regardless of payment method, this "pay for play" model is a huge benefit as it eliminates "selling" golf cart cooling systems to golf courses because the cooling system and payment system may be given to golf courses for "free" and installed on the course's entire fleet of golf carts whereby the golfers, not golf courses, would pay to use the cooling system. The "pay for play" model allows the golfer to "pay" to activate the cooling system on their golf cart at any time they choose during their round of golf. Additionally, the golf course may choose to pay for the cooling system for each user such as at a higher end golf course. If the credit card/handheld payment device is found to be valid by the card reader/display unit 13 (which means that the payment is validated, but not yet authorized), the card reader/display unit 13 communicates with a bank/computer to authorize funds necessary to complete the transaction. The communication can be carried out by the communications unit 22. Live credit card processing may or may not happen from the cart. For example, if the card reader/display unit 13 determines a valid payment method (e.g., the payment is validated), the data could be stored and processed later (to authorize the payment) when the communications unit 22 is in range of the base station. Stored credit card data could be transferred via wireless gateway over a secure, encrypted connection to the central management system on the Internet. Alternatively, there is also the possibility of using cellular, Bluetooth, or other wireless technology with, or in place of, swiping an actual credit card and merchant transactions will then be processed by the central management system. Failed transactions would be retried automatically a specifiable number of times. If the credit card still fails, the number will be marked "bad" or "unusable."

Once the card reader/display unit 13 authorizes funds or determines a valid payment method for the cooling system, the card reader/display unit (13) and/or the control/communications unit 22 activates the pump 15 and fans 16 (34). Once activated, the pump 15 draws the liquid from the reservoir 11 through the tubing 18 and delivers it to the accumulator 19. Before the pump is activated, the accumulator is pre-pressurized with air. Once the accumulator 19 is additionally pressurized with liquid by the pump 15, the pump 15 shuts off. Then, the pressurized liquid is delivered from the properly pressurized accumulator 19 via tubing 18 to the one or more mister heads/nozzles 20 wherein the amount of mist output from the one or more mister heads/nozzles 20 depends on the intensity controller switch(es) 21 so that the liquid does not exit the mister heads/nozzles 20 in the form of mist until the intensity controller switch(es) 21 are turned on. Once the intensity controller switch(es) 21 are turned on, mist can be delivered to vehicle occupant(s) via the mister heads/nozzles 20 either with the fans 16 on or off wherein the user of the vehicle controls the speed and direction of the fans 16 and turns the fans 16 on/off. The fans 16 increase the misting effectiveness, especially in high-humidity areas where mist without air movement is less effective to cool an occupant of the vehicle.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A device that provides cooling to an occupant of a vehicle in which the cooling device is mounted, the device comprising:
   a liquid reservoir that is capable of containing a liquid;
   a pump that pressurizes liquid from the liquid reservoir when the liquid reservoir is filled with liquid;
   one or more misters connected to the pump that are capable of delivering a mist, using the pressurized liquid, directed towards an occupant of the vehicle;
   one or more fans located adjacent to the one or more misters that are capable of blowing the mist from the one or more misters towards the occupant of the vehicle to provide mist and air flow that cools the occupant of the vehicle; and
   a payment system, connected to the pump and the one or more fans, that controls the operation of the pump and one or more fans once a payment by the occupant of the vehicle is authorized.

2. The device of claim 1, wherein the payment system further comprises a trigger that activates the pump and the one or more fans when the payment by the occupant of the vehicle is validated.

3. The device of claim 1, wherein the payment system further comprises a timer unit that activates the trigger for a predetermined amount of time when the payment by the occupant of the vehicle is validated.

4. The device of claim 3, wherein the payment by the occupant of the vehicle is authorized at the time of validation.

5. The device of claim 3, wherein the payment by the occupant of the vehicle is authorized at a time after the validation.

6. A vehicle having a device that provides cooling to an occupant of the vehicle, the vehicle comprising:
   a seating area for at least one occupant of the vehicle;
   a liquid reservoir that is capable of containing a liquid;

a pump that pressurizes liquid from the liquid reservoir when the liquid reservoir is filled with liquid;

one or more misters connected to the pump that are capable of delivering a mist, using the pressurized liquid, directed towards an occupant of the vehicle;

one or more fans located adjacent to one or more misters that are capable of blowing the mist from the one or more misters towards the occupant of the vehicle to provide mist and air flow that cools the occupant of the vehicle; and a payment system, connected to the pump and the one or more fans, that controls the operation of the pump and one or more fans once a payment by the occupant of the vehicle is authorized.

7. The vehicle of claim 6, wherein the payment system further comprises a trigger that activates the pump and the one or more fans when the payment by the occupant of the vehicle is validated.

8. The vehicle of claim 7, wherein the payment system further comprises a timer unit that activates the trigger for a predetermined amount of time when the payment by the occupant of the vehicle is validated.

9. The vehicle of claim 8, wherein the payment by the occupant of the vehicle is authorized at the time of validation.

10. The vehicle of claim 8, wherein the payment by the occupant of the vehicle is authorized at a time after the validation.

11. The vehicle of claim 8, wherein the vehicle is an open air vehicle.

12. The vehicle of claim 11, wherein the open air vehicle is a golf cart.

13. A device that provides cooling to an occupant of a vehicle in which the cooling device is mounted, the device comprising:

a liquid reservoir that is capable of containing a liquid;

a pump that pressurizes liquid from the liquid reservoir when the liquid reservoir is filled with liquid;

one or more misters connected to the pump that are capable of delivering a mist, using the pressurized liquid, directed towards an occupant of the vehicle; and a payment system, connected to the pump, that controls the operation of the pump once a payment by the occupant of the vehicle is validated.

14. The device of claim 13, wherein the payment system further comprises a trigger that activates the pump when the payment by the occupant of the vehicle is authorized and a timer unit that activates the trigger for a predetermined amount of time when the payment by the occupant of the vehicle is authorized.

15. The device of claim 13 further comprising one or more fans located adjacent the one or more misters that are capable of blowing the mist from the one or more misters towards the occupant of the vehicle to provide mist and air flow that cools the occupant of the vehicle.

16. The device of claim 15, wherein the payment system is connected to the fan that controls the operation of the one or more fans.

17. The device of claim 16, wherein the payment system further comprises a trigger that activates the pump and one or more fans when the payment by the occupant of the vehicle is validated.

18. The device of claim 17, wherein the payment system further comprises a timer unit that activates the trigger for a predetermined amount of time when the payment by the occupant of the vehicle is validated.

19. The device of claim 18, wherein the payment by the occupant of the vehicle is authorized at the time of validation.

20. The device of claim 18, wherein the payment by the occupant of the vehicle is authorized at a time after the validation.

* * * * *